United States Patent
Gaeta et al.

(10) Patent No.: US 7,346,334 B2
(45) Date of Patent: Mar. 18, 2008

(54) METHOD OF PREVENTING DETONATION OF A MOBILE-TERMINAL-TRIGGERED EXPLOSIVE DEVICE

(75) Inventors: Anthony J. Gaeta, Clifton, NJ (US); Charles John Meyer, Wayne, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 49 days.

(21) Appl. No.: 11/171,764

(22) Filed: Jun. 30, 2005

(65) Prior Publication Data

US 2007/0021097 A1    Jan. 25, 2007

(51) Int. Cl.
*H04Q 7/20* (2006.01)
(52) U.S. Cl. .................... 455/404.1; 455/410; 455/411
(58) Field of Classification Search ................ 455/403, 455/422.1, 404.1, 410, 411, 404.2, 414.1, 455/450, 453, 500, 39, 7, 11.1, 433, 445, 455/456.1, 456.2, 558, 434, 517, 524, 62; 340/539.15, 539.16, 539.23, 572.3
See application file for complete search history.

(56) References Cited

U.S. PATENT DOCUMENTS

| | | | |
|---|---|---|---|
| 6,088,586 A * | 7/2000 | Haverty .................. | 455/422.1 |
| 6,233,447 B1 * | 5/2001 | Tomoike ..................... | 455/411 |
| 6,249,674 B1 * | 6/2001 | Verdonk .................. | 455/404.1 |
| 6,345,180 B1 * | 2/2002 | Reichelt .................. | 455/404.1 |
| 6,556,810 B2 * | 4/2003 | Suzuki ........................ | 455/88 |
| 2001/0005681 A1 * | 6/2001 | Kim ........................... | 455/458 |
| 2003/0157923 A1 * | 8/2003 | Tani ........................... | 455/404 |
| 2004/0176066 A1 * | 9/2004 | Binzel et al. ............ | 455/404.1 |
| 2004/0203576 A1 * | 10/2004 | Droste et al. ............ | 455/404.1 |
| 2005/0170853 A1 * | 8/2005 | Verma et al. ............ | 455/456.6 |
| 2006/0194566 A1 * | 8/2006 | Oesterling ............... | 455/404.1 |

OTHER PUBLICATIONS

Phone as triggers Los Angeles Journal, Apr. 26, 2004.*

* cited by examiner

*Primary Examiner*—Jean Gelin

(57) ABSTRACT

When a bomb that might be triggered by a ringing mobile terminal is suspected of being located within a target zone, the base stations whose coverage areas include a critical area that surrounds and encompasses that target zone are switched into a one-way calling mode that prevents the mobile terminals within that critical area from receiving incoming calls, but still allows users of those mobile terminals to place to place outgoing calls. The one-way calling mode is effected in response to a signal received by a base station from its associated MSC that instructs it to disable its paging function, thereby preventing the mobile terminal from receiving and responding to a signal that indicates that an incoming call is present, and thus prevents the base station from sending a signal to the mobile terminal that activates its ringing circuitry.

3 Claims, 1 Drawing Sheet

METHOD OF PREVENTING DETONATION OF A MOBILE-TERMINAL-TRIGGERED EXPLOSIVE DEVICE

TECHNICAL FIELD

This invention relates to wireless communications and, more particularly, to a method for preventing the detonation of an explosive device that has been configured to be triggered through the ringing of a mobile terminal.

BACKGROUND OF THE INVENTION

In recent years, unfortunately, the general population has fallen victim to terrorist attacks on many fronts. From the 9/11 attack on the World Trade Center in New York City, to the train bombing in Madrid, Spain, the general public both within and outside the United States has increasingly been the target of unprovoked assaults on their lives causing a general feeling of lack of safety in public places among the populace. In several instances, such as the train bombing in Madrid and other incidents in the mid-East and elsewhere, bombs have been triggered by ringing a mobile terminal. Specifically, investigators have determined in many of these incidents that the ringer of a mobile terminal has been wired to a bomb's detonator. This has enabled terrorists to surreptitiously plant a bomb in a public place and after removing themselves from the bomb's location, remotely detonating it by placing a call to that mobile terminal. When the mobile terminal is called, activation of the ringer circuitry triggers the bomb's detonator causing the bomb to explode resulting in widespread destruction of lives, property, and ensuing mayhem.

Recently, in fear of possible attacks using mobile terminal triggered bombs, various law enforcement bodies have taken to illegally jamming the airwaves in the vicinity of suspected target areas. Thus, for example, when security has been threatened in certain airports, officials have used jamming techniques, which prevent use of any mobile terminal for any purpose within the jammed area. Such jamming, unless specifically authorized by the FCC in certain situations, is illegal in the United States. Further, such jamming hampers emergency workers within the jammed area from making necessary calls for help within the jammed area where a bomb is suspected of being located, or even being able to inform their co-workers outside the area of investigation that they have found an item or person of a suspicious nature within the jammed area. Furthermore, jamming of all mobile traffic within an area such as an airport or within any geographical area, can have the side effect of causing panic amongst mobile terminal users within the jammed area who suddenly find that are no longer able to initiate any calls and are able to deduce that that condition is the result of a possibly life-threatening situation in their vicinity.

SUMMARY OF THE INVENTION

In accordance with an embodiment of the invention, upon receiving a signal from an authorized user, the mobile system operative within a critical geographic area that includes and surrounds a suspected target zone is switched to operate in a one-way calling mode that enables a user within that critical area to only initiate messages, such as a call, via his mobile terminal but prevents any incoming messages, such as calls, from reaching that mobile terminal. In this way, emergency workers and others within the critical area are not blocked from sending outgoing messages, such as placing necessary outgoing calls, while still preventing the triggering of an explosive device via an incoming message, such as a call, directed to a possible bomb-detonating mobile terminal within the target zone and surrounding critical area.

Within a critical area that is served by multiple service providers, coordination and collaboration between service providers will enable the authorized user to initiate such a switch-over to the one-way calling mode in the critical area included with each of the service provider's networks.

In an embodiment of the present invention, one-way calling within the designated critical area is achieved by disabling the transmission of a paging signal to all mobile terminals within that area. Thus, each of the base stations that services the critical area are signaled so shut down their paging function, thereby preventing any mobile terminal within that area to be signaled of the presence of an incoming call and thereby the triggering of the terminal's ringing mechanism.

In other embodiments, all incoming data messages to any type of mobile terminal, such as a PDA or other mobile device, are precluded from being received by inhibiting the transmission of data messages to these devices in response to a signal from an authorized user.

DETAILED DESCRIPTION

Figure 1:
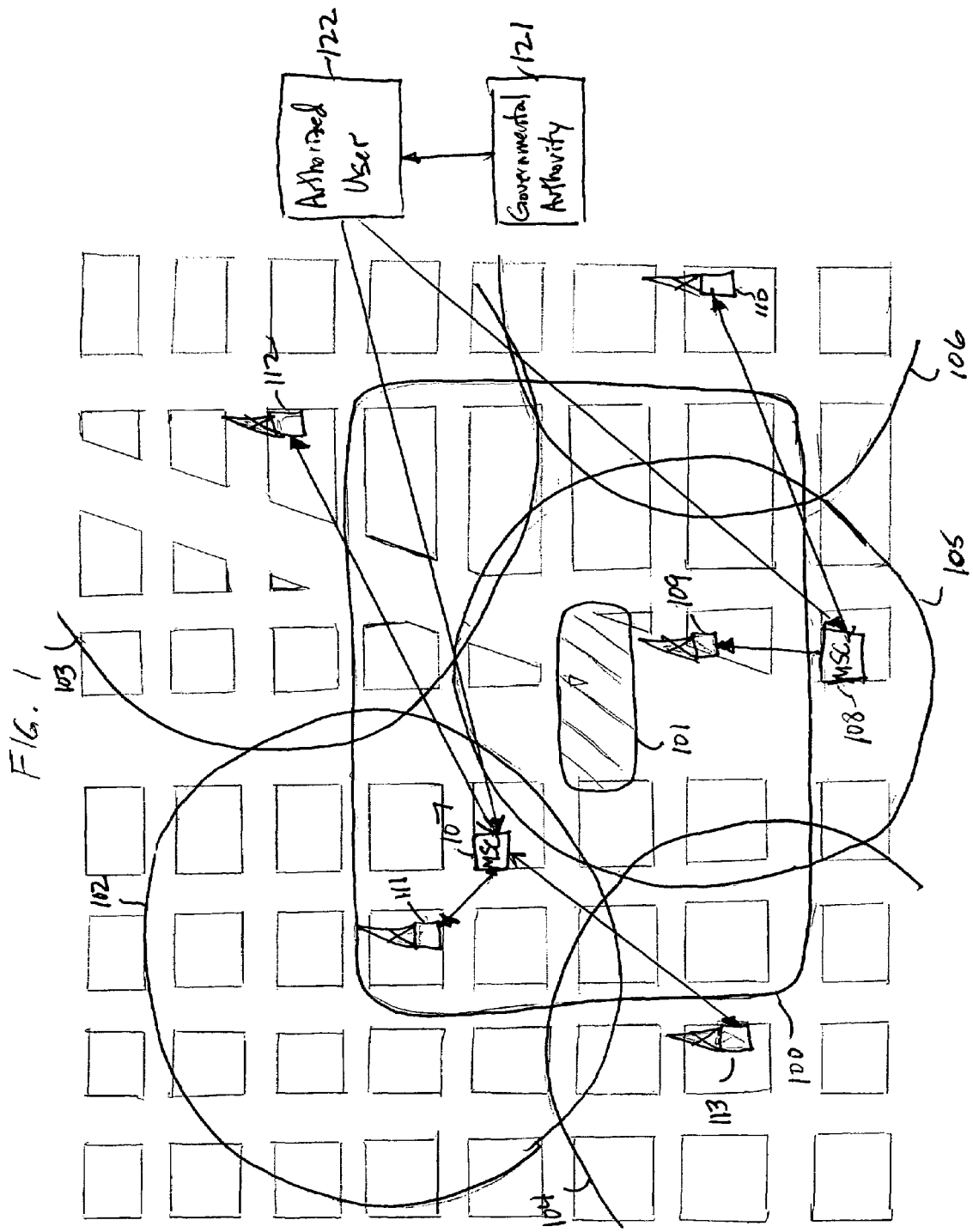
FIG. 1 shows a suspected geographic target zone of a possible bomb attack, the critical area that includes and surrounds the target zone, and the plurality of base stations and their respective coverage areas that encompass the critical area

In the embodiment described below, for purposes of illustration only, the mobile terminal used to trigger a bomb is assumed to be a mobile telephone whose ringing circuitry is assumed to be rigged to detonate the bomb when it receives an incoming call. As is later noted, it can be assumed that any type of mobile terminal could be similarly rigged to trigger the detonation of a bomb when it receives any type of incoming message, be it an incoming call or any type of data message, for example.

In FIG. 1, a critical area 100 on an exemplary street map is illustratively shown surrounding and including a geographic target zone 101 within which authorities have reason to believe that a bomb attack might imminently occur. Critical area 100 is illustratively shown falling within the coverage areas 102, 103, 104, 105 and 106 of a plurality of cell sites. Some of the base stations within these coverage areas are illustratively shown connected to Mobile Switching Center (MSC) 107, while others are illustratively shown connected to MSC 108. Thus, base stations 109 and 110 within coverage areas 105 and 106, respectively, are shown connected to MSC 107, and base stations 111, 112 and 113 within coverage areas 102, 103 and 104, respectively, are shown connected to MCS 108. MSCs 107 and 108 are connected to the Public Switched Telephone Network (not shown). It should be understood that the term "base station" as used herein is intended to include any centralized network element in a wireless network with which the mobile terminals communicate. Similarly, the term "mobile switching center" is intended to include any centralized network element in a wireless network to which a plurality of base stations communicate.

When the local or state police, the FBI, or other governmental authority 121 has reason to believe that a bomb is within target zone 101 that possibly might be configured to be remotely detonated by calling an attached mobile terminal, a representative from such authority contacts an authorized user 122 by means of a secure telephone or other secure communications methodology. That authorized user 122 upon affirming the identity and legitimacy of the received message and a description of the geographic location of the target zone 101 and the surrounding critical area 100, determines which MSCs are associated with the base stations whose coverage areas are determined to include critical area 100. Illustratively, the authorized user upon being provided with the loci of the target zone 101 and critical area 100, determines that MSC 107 and its associated base stations 111, 112 and 113, and, and MSC 108 and its associated base stations 109 and 110, are the pertinent MSCs and associated base stations whose coverage areas encompass critical area 100. Determining which MSCs and associated base stations are associated with a specified geographically defined target zone and critical area can be readily automated through a computer program.

Once the MSCs and base stations associated with critical area 100 are identified, signals are sent to MSC 107 and MSC 108 that identifies those base stations which are to enter a one-way calling mode in order to prevent incoming calls to those mobile terminals within those base stations' coverage areas, but does not preclude a user at each such mobile terminal from initiating an outgoing call. By so preventing all incoming calls directed to all the mobile terminals in the critical area 100, a bomb that is configured to be detonated by a ringing mobile terminal within target zone 101 will be blocked from receiving the triggering incoming call. Advantageously, users of mobile terminal who have been switched to the one-way calling mode are still able to place outgoing telephone calls and are likely not to be aware of their inability to receive incoming calls, thereby preventing possible panic that might arise if many users suddenly and inexplicably found themselves unable to make any outgoing calls. Furthermore, by allowing users of the mobile terminals within the critical area 100 and target zone 101 to make outgoing calls, emergency and security workers looking to find the bomb and the suspected perpetrators within those areas are still able to use their own mobile terminals to contact officials to relay critical information that needs to be provided to authorities.

One method for transitioning the mobile terminals within the coverage areas 102, 103, 104, 105, and 106 that encompass the critical area 100 into a one-way calling mode is by the corresponding base stations 111, 112, 113, 109, and 110, respectively, disabling their downlink paging functions upon receiving a signal directed them to do so from their associated MSCs. By disabling its paging function, a base station is unable to signal a mobile terminal within its coverage area that it has an incoming call is waiting to be connected. Thus, the mobile terminal to which the call is directed is unable to respond to the base station to inform it that it is available to accept that incoming call. The base station, not receiving any response from that mobile terminal to which the incoming call is directed, thus fails to deliver a signal to that mobile terminal to activate its ringing circuitry. Thus, if that mobile terminal should be connected to a bomb's detonator, the absence of a ringing-circuitry-activating signal prevents the mobile terminal from triggering the bomb to explode.

Accordingly, in accordance with this embodiment of the invention, the authorized user 122, upon receiving an indication from a government authority 121 that there is the possibility of a bomb within a target zone 101, determines those base stations whose coverage areas include the critical area 100 surrounding the target zone 101, which in this illustrative example are base stations 109, 110, 111, 112 and 113. A message is then sent to these base station's associated MSCs 107 and 108 requesting the MSCs to signal those base stations to disable their paging functions.

As more than one service provider will be providing wireless services to any geographic area, coordination between such multiple service providers is needed to ensure that all the base stations whose coverage areas include the critical area 100 are switched to the one-way calling mode upon being alerted to do so.

Although bombs have typically been detonated through a ringing mobile telephone, any other type of mobile device such as a PDA, or other analog or digital mobile terminal in which receipt of any type of incoming message could be used to trigger any type of explosive device or other type of device that upon detonation could cause panic and/or harm to lives and property.

Although described in connection with a bomb threat, embodiments of the present invention could be applied to other emergency situations that might occur in which a ringing mobile terminal could deleteriously impact the situation either through triggering of another device, or from the ringing of the mobile terminal itself, as for example, in a hostage situation.

The above-described embodiment is illustrative of the principles of the present invention. Other embodiments could be devised by those skilled in the art without departing from the spirit and scope of the invention.

The invention claimed is:

1. A method comprising the steps of:
at a base station, in response to a received signal that has been sent when an emergency situation has been determined to be present or imminent in a critical area that is located at least in part in a coverage area of the base station, disabling at least one mobile terminal that is located within the base station's coverage area into a mode of operation wherein the at least one mobile terminal is prevented from receiving an incoming message over a wireless communication network but that doesn't prevent a user of the mobile terminal from sending an outgoing message, wherein the base station is a centralized element of the network with which the at least one mobile terminal communicates for transmitting information over the network.

2. The method of claim 1 wherein the message is a call.

3. The method of claim 1 wherein the step of disabling comprises disabling the paging function of the base station.

* * * * *